Sept. 3, 1929.  W. A. SCHMITTGEN  1,727,134
FASTENER
Filed Dec. 17, 1927
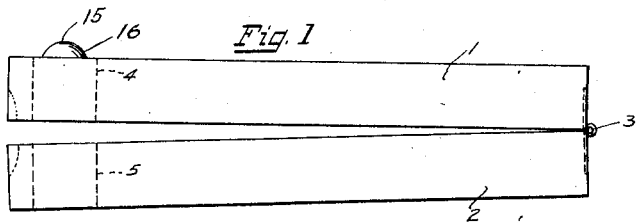
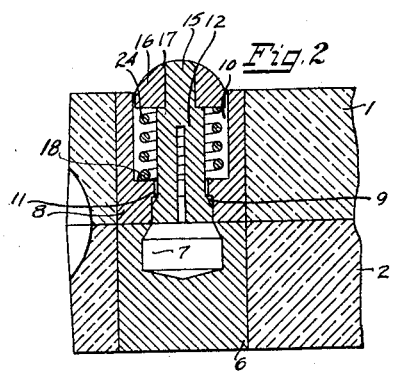
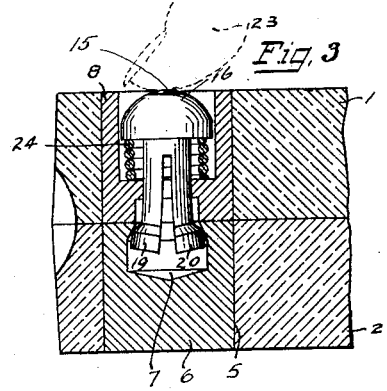
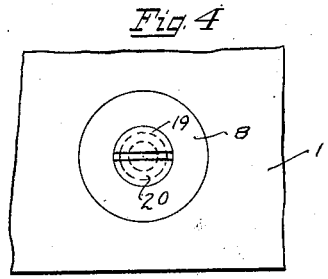
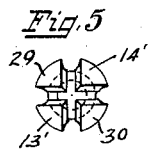
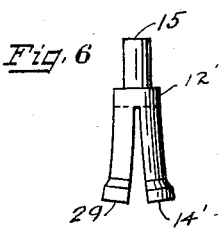
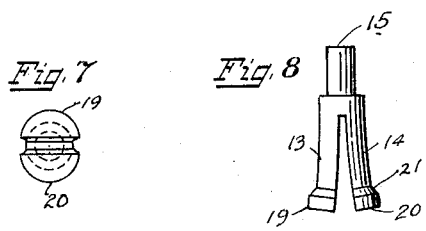
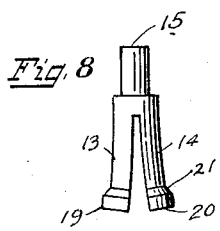
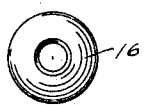
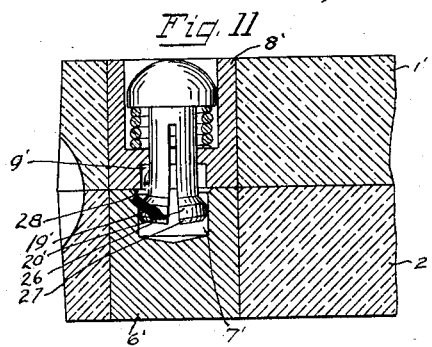
Inventor:
William A. Schmittgen.
by Frank M. Slough.
his attorney.

Patented Sept. 3, 1929.

1,727,134

UNITED STATES PATENT OFFICE.

WILLIAM A. SCHMITTGEN, OF ELYRIA, OHIO, ASSIGNOR TO THE GENERAL INDUSTRIES COMPANY, OF ELYRIA, OHIO, A CORPORATION OF OHIO.

FASTENER.

Application filed December 17, 1927. Serial No. 240,709.

My invention relates to fasteners and relates more particularly to fasteners of the general type represented by latches, snaps and the like.

An object of my invention is to provide an improved fastener adapted to be operated by the pressing of a part of one of two cooperative fastener elements so as to effect engagement between said part and a portion of the other cooperative element of the pair, whereby the elements will be secured together by the interengagement of the said part and said other element, and therefore the two supports for the cooperative elements will be secured together through the elements.

Another object of my invention is to provide an improved fastener for a pair of supports each supporting a cooperative element of the fastener whereby the supports may be frictionally held together upon a simple operation of the fastener, under conditions wherein considerable resistance to unfastening is had and at the same time permitting the ready disassociation of the supports by a simple manual effort tending to force the supports apart.

Another object of my invention is to provide a fastener of the above general character which may be inexpensively manufactured and which is readily applicable to many different kinds of materials adapted to be removably held together by the fastener.

Other objects of my invention and the invention itself will become apparent by reference to the following description of an embodiment of my invention and in which description reference will be had to the accompanying drawings forming part of this specification.

In the drawings:

Fig. 1 illustrates a pair of hinged boards supporting at their free ends a pair of cooperative elements of a fastener mechanism embodying the principles of my invention.

Fig. 2 is a longitudinal medial vertical section of the embodiment of Fig. 1.

Fig. 3 is a view similar to that of Fig. 1 with the hinged parts shown as secured together by the fastener mechanism of Figs. 1 and 2.

Fig. 4 is a bottom plan view of the upper board and fastener mechanism supported thereby in the positions assumed by the parts in Fig. 2.

Fig. 5 is a bottom end view of a modified form of plunger which may be substituted for that illustrated in Figs. 2 to 4 inclusive.

Fig. 6 is a view in elevation of the plunger of Fig. 5.

Figs. 7 and 8 are views similar to that of Figs. 5 and 6 these views, however, being of the plunger employed in the mechanism of Figs. 2 to 4 inclusive.

Figs. 9 and 10 are plan and elevational views respectively of the button or manually engageable knob for the plunger of the foregoing figures and adapted to transmit manual effort to operate the fastener to the plunger.

Fig. 11 is a view similar to that of Fig. 3 of another embodiment of my invention.

Referring now to the foregoing figures in all of which like parts are designated by like reference characters, and referring first to the embodiment of my invention illustrated in Figs. 1 to 4 inclusive and 7 to 10 inclusive, at 1 and 2 I show respectively a pair of boards secured together by a hinge 3 upon which the boards are relatively rotatable to bring together or to separate the free ends of the boards. The free ends of the boards are perforated, the perforation 4 of the board 1 and the perforation 5 of the board 2 being preferably of approximately the same size and in axial alignment, and each are adapted to receive a fastener element pressed firmly within the walls of the perforation. Within the perforation of the board 2 is tightly pressed a fastener 6 having an axially disposed recess 7 presented toward the fastener element body 8 of the other fastener element which is axially recessed at both its ends, at 9 and 10, the wall or web 11 between the spaced axial recesses 9 and 10 being centrally perforated to permit reciprocation of a plunger 12 therethrough.

The plunger 12 comprises split separated portions 13 and 14 comprising prongs or forks of a reduced shank or stem 15 which supports an annular button or knob 16 telescoped over the reduced end portion of the shank or stem 15 and is seated on the shoulder at the junction of the reduced and non-reduced portions of the plunger, the end portions of the stem being expanded by being peened over as shown at 17 to retain the button 16 in place on the stem. A preferably helical spring 24 is interposed between the button and the end wall 18 of the recess 10 to constantly exert pressure against the under side of the button to tend to keep the plunger in its retracted position as illustrated in Fig. 2, whereby the friction jaws 19 and 20 at the end of fork prongs 13 and 14 are kept in non-expanded condition within the recess 9 of the body 8.

Prior to the projection of the bifurcated plunger 12 through the perforated annular web 11 of the fastener element body 8, the prongs thereof have been formed, as illustrated in Fig. 8 divergently with the contact jaws 19 and 20 relatively widely separated as compared with their relative positions illustrated in Fig. 2. The prongs 13 and 14 supporting the jaws are preferably made of good spring material, and preferably metallic, and when once given the expanded form illustrated in Figs. 7 and 8, by the inherent resiliency of the material, will always exert an effort tending to restore them to their normal unstressed form as illustrated in Fig. 8 when distorted therefrom tending to make the jaws 19 and 20 approach each other as illustrated in Figs. 2 and 3.

In operation, the mechanism of my invention exemplified as illustrated in Figs. 2 to 4 and 7 to 10 inclusive, operates as follows: The prongs are compressed inwardly from their more expanded positions illustrated particularly in Fig. 8 to a more contracted position illustrated in Fig. 2 by the projection of the plunger 12 upwardly through the perforated web 11 with the attendant compressive effect had by the walls of the web perforation against the exterior surfaces of the plunger supplemented by the compressive effect of the edge and wall surfaces of the recess 9 against the bevelled surfaces 21 of the jaws 19 and 20.

In the position illustrated by the plunger in Fig. 2 a certain amount of lateral clearance is had between the outer surfaces of the neck 22 of the plunger, comprising the outer surfaces of the prongs above the jaws and below the button, to permit the lateral expansive movement of the prongs to effect spring pressed frictional contact between the inner walls of the recess 7 of the fastener element 6 and the jaws 19 and 20 as illustrated in Fig. 3 when the button 15 is engaged by the finger of an operator indicated at 23, Fig. 3, and pressed downwardly to effect operation of the fastener. Depression of the plunger effected by pressure on the button as illustrated, compresses the helical spring 24 against the power of its inherent resiliency and permits lateral movement of the inherently resilient prongs 13 and 14 to separate tending toward the fully expanded position of Fig. 8, but prevented from attaining such fully expanded form by the confining lateral walls of the recess 7, the upper portions of such walls being inwardly converging and adapted to be engaged by the jaws of the partially compressed prongs 13 and 14 to frictionally restrain the plunger from being retracted to the position indicated in Fig. 2 by power of the spring 24. The inherent resiliency of the material comprised in the prongs tending to make them diverge, maintains sufficient frictional contact with the lateral walls of the recess 7 so that the two hinged boards 1 and 2 will, through the plunger 12, spring 24 and plunger rod, be held resiliently together by the frictional contact of the jaws at the ends of the prongs with the lateral walls of the recess. This effect is increased by the inward inclination of the uppermost portion of the lateral recess walls as illustrated in Figs. 2 and 3.

In Figs. 5 and 6 there is shown a modified form of plunger, corresponding to the plunger 12, at 12', but wherein four prongs 13', 14', 29 and 30 are provided, each having jaws at their ends operating substantially in the same manner as the jaws 19 and 20 for the plunger 12, illustrated in Figs. 2 and 3.

In Fig. 11 another embodiment of my invention is shown comprising a modified form of recess 7' of the lowermost fastener element 6' secured in the board 2', which is substantially of the same diameter as the lowermost axially aligned recess 9' in the fastener element 8' secured in the top board 1'. In this embodiment the plunger is held in its depressed operative position by a frictional contact of the jaws 19' and 20', formed as shown, preferably with bevelled end surfaces, 26 and 27, respectively, above and below their peripheral intermediate contact portions.

As a further feature of improvement, the recess 7' may flare slightly as shown at 28 to facilitate projection of the rod jaws into the recess 7' where precise axial alignment of the recesses of the upper and lower elements 6 and 8 is not had.

I propose and hereby expressly disclose, also, the provision of bevelled portions such as 26 and 27 for plungers such as the plungers 12 and 12', and also where desired, flaring portions 28 for the recesses 7 of the foregoing embodiment plunger and plunger socket elements.

In all of the embodiments of my invention herein disclosed it will be seen that I have provided a pair of cooperating fastener elements comprising a socket element 6 and a plunger support and guide element 8 and that any articles separately supporting these two elements may be secured by an initial operation projecting the plunger into the socket of the socket element and thereafter by the frictional contact had between the lateral surfaces of the plunger prongs spring pressed by the effect of the inherent resiliency of the material of the prongs tending to restore the prongs to their pre-formed bifurcated positions, and the amount of friction contact may be increased, as illustrated in Figs. 2 and 3, by suitably forming the lateral walls of the socket. Also inexact alignment of the socket recess with the plunger may be compensated for by suitably forming the ends of the plunger prongs and alternately, or at the same time, flaring the lateral walls of the socket at the mouth thereof. Restoration of the plunger requiring convergence of the prongs, may be facilitated by suitably forming the portion of the prong surfaces as illustrated at 27, Figs. 6, 8 and 11.

Having thus described my invention in certain specific embodiments, I am aware that numerous and extensive departures may be made from the embodiment herein illustrated and described but without departing from the spirit of my invention.

I claim:

1. In a fastener, a pair of co-operative fastener elements adapted to be removably secured together to fasten two articles together, each one of which carries a different one of the elements, said fastener elements having opposing faces with alignable recesses, one of said elements being bored axially through the end wall of its recess to the opposite face of the element, and an interlocking member for the elements adapted to be projected simultaneously into the aligned recesses, said member being bifurcated at one end and inwardly constrained against the inherent resiliency of the material of its forks by the lateral walls of the recess into which the bifurcated end of the member is disposed, the other end of the fastener member projected through the said end wall bore of the other fastener element and a head therefor disposed adjacent the said opposite element face adapted to be manually pressed to project the bifurcated end of the member into the recess of the other element.

2. In a fastener, a pair of co-operative fastener elements adapted to be removably secured together to fasten two articles together, each one of which carries a different one of the elements, said fastener elements having opposing faces with alignable recesses, one of said elements being bored axially through the end wall of its recess to the opposite face of the element, and an interlocking member for the elements adapted to be projected simultaneously into the aligned recesses, said member being bifurcated at one end and inwardly constrained against the inherent resiliency of the material of its forks by the lateral walls of the recess into which the bifurcated end of the member is disposed, the other end of the fastener member projected through the said end wall bore of the other fastener element and a head therefor disposed adjacent the said opposite element face adapted to be manually pressed to project the bifurcated end of the member into the recess of the other element, and a compression spring disposed between the said end wall and said head, tending to resiliently withdraw the bifurcated end of the member from the recess of the other element.

3. In a fastener, a recessed socket element, a co-operating element comprising a recessed body, a plunger normally disposed substantially within the body, said plunger comprising a bifurcated end portion adapted to be projected longitudinally of the body recess into a socket recess of the socket element, the forks of said plunger being of inherently resilient metallic material normally formed relatively divergent and normally pressing outwardly against the constraining walls of the body recess, a head for the plunger normally projected from the recessed body at one side, manually engageable to press the plunger forks into the socket recess of the socket element, said socket recess comprising an inner inwardly disposed portion of larger diameter than the fork constraining walls of the body recess.

4. In a fastener, a recessed socket element, a co-operating element comprising a recessed body, a plunger normally disposed substantially within the body, said plunger comprising a bifurcated end portion adapted to be projected longitudinally of the body recess into a socket recess of the socket element, the forks of said plunger being of inherently resilient metallic material normally formed relatively divergent and normally pressing outwardly against the constraining walls of the body recess, a head for the plunger normally projected from the recessed body at one side, manually engageable to press the plunger forks into the socket recess of the socket element.

In testimony whereof I hereunto affix my signature this 14 day of December, 1927.

WILLIAM A. SCHMITTGEN.